March 11, 1958     W. A. HUMPHREY     2,825,924
COMBINED CORD REEL AND SWITCH

Filed Jan. 18, 1954     2 Sheets-Sheet 1

March 11, 1958  W. A. HUMPHREY  2,825,924
COMBINED CORD REEL AND SWITCH
Filed Jan. 18, 1954  2 Sheets-Sheet 2

United States Patent Office 2,825,924
Patented Mar. 11, 1958

2,825,924

COMBINED CORD REEL AND SWITCH

Warren A. Humphrey, Canton, Ohio, assignor to The Hoover Company, North Canton, Ohio, a corporation of Ohio Application January 18, 1954, Serial No. 404,568

7 Claims. (Cl. 15—323)

My present invention relates to a combined cord reel and switch device which is applicable to electrical appliances generally of the type which utilize an elongated service cord to connect the appliance to a service outlet. My invention is particularly useful when applied to appliances which are customarily moved about when in use. As an example of the foregoing type of appliance I have illustrated by invention herein as applied to a suction cleaning device.

It is a principal object of my invention to provide a combined cord reel and switch assembly which may be sold as a unit to be applied to existing devices or which may be incorporated in a household appliance when the same is originally sold.

It is a particular object of my invention to provide a cord reel wherein the slip rings which are used to connect the rotating parts of the reel to the stationary connections of the appliance are normally out of engagement with the brushes or current collectors associated therewith while the cord storage drum is being rotated with the resulting economy of parts and great reduction in wear.

It is a further specific and particular object of my invention to provide a cord reel and switch assembly wherein the moving parts of the switch which shift to make or break the electrical connections also serve as the current collectors for the rotating cord reel drum thus producing an economy in parts at a great reduction in wear as the switch will normally be in the open circuit position when the cord reel drum is rotating.

Other objects and advantages of my invention will become apparent as the description proceeds when taken in connection with the accompanying drawing wherein.

Figure 1:
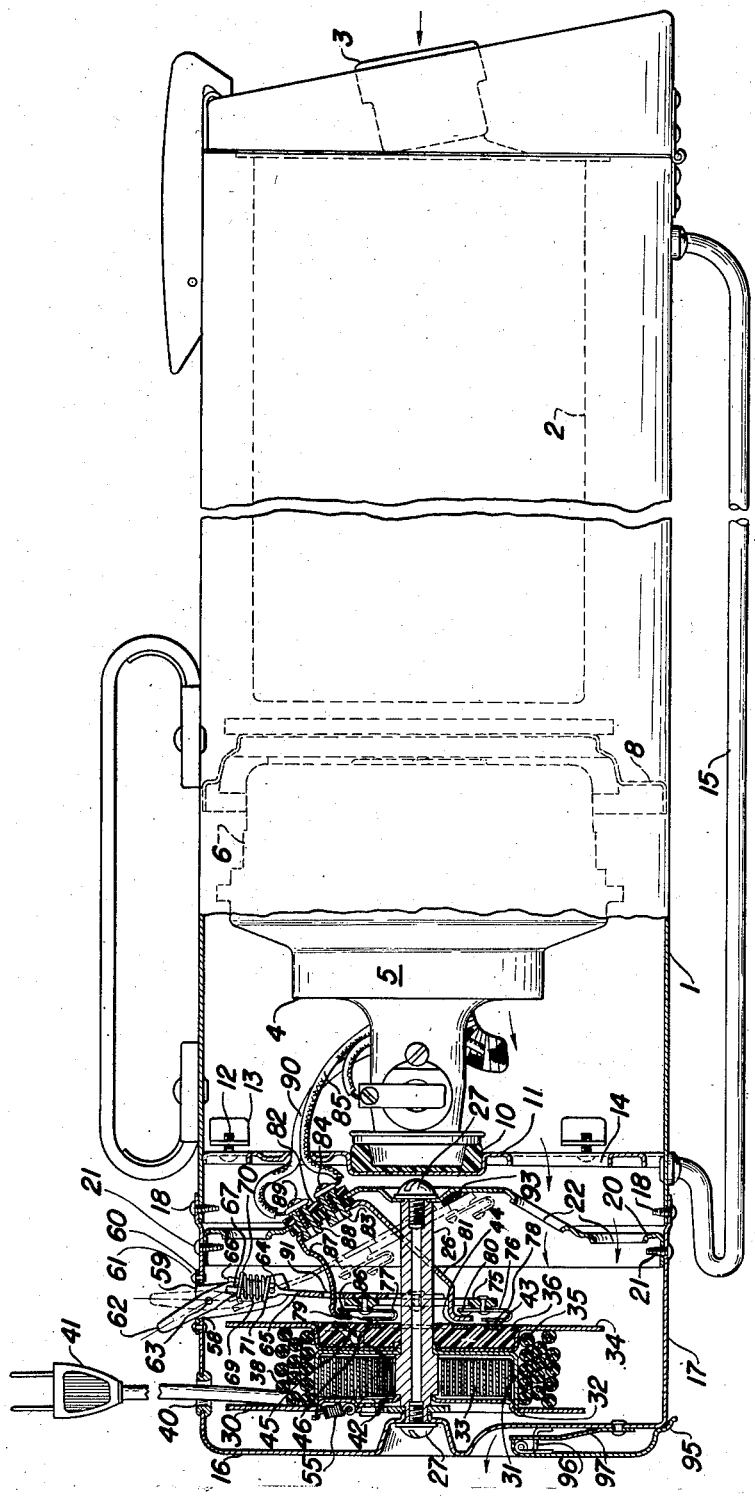
Figure 1 is a side elevational view of a suction cleaner embodying my invention with the cord reel portion of the apparatus shown in section taken along the line 1—1 of Figure 2 and looking in the direction of the arrows.

Referring now to the drawing in detail and first to Figure 1 thereof, there is illustrated a suction cleaner of a known type consisting essentially of an outer metal or plastic casing 1 within which is suitably mounted an air filter 2 adapted to receive dirty air led into the cleaner through a suction hose connector 3. To the left of the filter, as viewed in Figure 1, there is mounted a motor 4 which drives the fan structure indicated in outline at 6 to produce air flow through the filter 2.

The motor fan assembly 5 and 6 is supported in the casing 1 by means of a supporting bulkhead 8 attached to the interior walls of the casing 1 at its periphery and to the fan housing 6 at its center. The other or left hand end of the motor fan assembly, as viewed in Figure 1, is supported by a shock absorbing rubber grommet 10 mounted on the center portion of a bulkhead 11. The bulkhead 11 has a configuration shaped complimentary to the internal configuration of the housing 1 and engages the interior wall thereof substantially throughout its periphery. The bulkhead 11 is secured to the interior of the casing 1 by being bolted as indicated at 12 to a plurality of spaced angle members 13 which are welded to the interior surface of the casing 1.

The bulkhead 11 is provided with a plurality of circumferentially spaced airflow openings such as the opening 14 through which air discharging from fan 6 is exhausted to the atmosphere or to a blower as may be desired and will be explained hereinafter. The cleaner casing 1 is equipped with suitable supporting skids or rods indicated generally by the reference character 15 as is well known in the art.

The cord reel and switch assembly is mounted in and supported by a housing structure consisting of a substantially flat end wall 16 from which a cylindrical wall 17 projects. The cylindrical wall 17 is detachably secured to the end of casing 1 by means of studs 18 and may thus be sold as a part of the original construction of the cleaner or may be sold as a replacement or auxiliary part as desired.

The end wall 16 of the cord reel assembly and switch housing is spaced from an interior end wall or bulkhead 20 which is secured to the wall 17 by means of studs 21. The bulkhead 20 is provided with a plurality of openings 22 to permit air discharged through the openings 14 to pass into the interior of the cord reel and switch housing and be exhausted therefrom in a manner to be described hereinafter.

A fixed shaft 26 extends between the wall 16 and bulkhead 20 and is secured to those members by studs 27 which serve to maintain the parts in rigid assembled relationship and also to hold the shaft 26 immovably in the casing.

Figure 2:
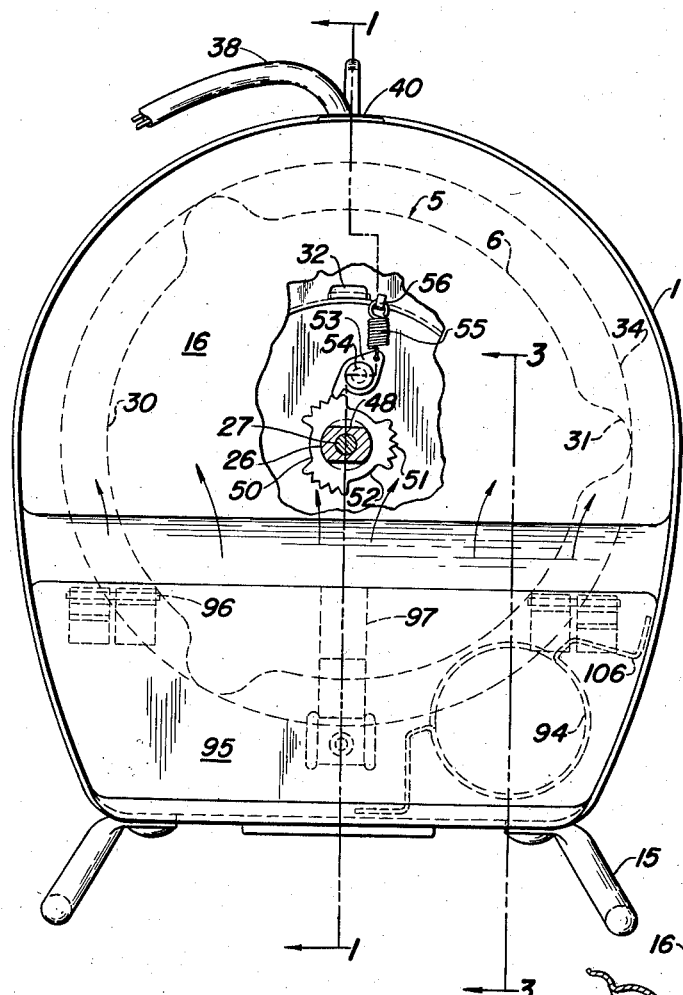
Figure 2 is an end view of the device of Figure 1 with parts of the casing broken away to show the interior structures.

The cord reel structure proper is mounted upon the shaft 26 and consists of a storage drum formed by an end disc 30 rotatably mounted upon the shaft 26 to which is attached a cup-shaped spring housing member 31. The housing member 31 is provided with extending locking tangs 32 which are extended through suitable openings in the disc 30 and bent over as indicated in Figures 1 and 2 to secure these parts together. A spiral tension spring 33 is housed within the cup-shaped member 31 between the bottom wall of that member and disc 30. One end of the spring 33 is rigidly secured in a conventional manner, by means not shown, to the shaft 26 and the other end thereof is secured to the cup-shaped member 31 so as to impart rotation to the member 31 about the shaft 26 when the spring is stressed. It will be understood that the cup-shaped member 31 is also rotatably mounted upon the stationary shaft 26 so that the members 30 and 31 rotate as a unit either under the force of the stressed spring 33 or when the members 30 and 31 are rotated by an outside force against the bias of the spring to increase the tension thereof as when the cord is unwound.

A second plate member 34 is provided about the shaft 26 and is provided with a central cup-shaped portion 35, the bottom wall of which bears against the end walls of member 31 to which it is secured in any suitable manner as by spot welding. Insulating material 36 is secured in the cup-shaped portion 35 of disc 34 to form a mounting and insulating means for slip rings to be described hereinafter. Thus the members 30, 31, 33, 34, and 35 defined a spring biased rotary cord storage reel or drum.

As illustrated in Figure 1 a service cord 38 is partially unwound from the storage drum. The free end of the cord 38 extends through a suitable grommeted outlet 40 provided in the wall 17 and terminates in a service connection plug 41 of conventional type. The inner end of the service cord 38 is suitably anchored to the reel drum structure and extends through an opening indicated by 42 in the cup-shaped member 35 where it terminates adjacent a pair of circular, concentric and spaced slip rings 43 and 44. The electrical conductors 45 and 46 of the service cord are connected to the slip rings 43 and 44, respectively. The slip rings 43 and 44 are adapted to be connected to a switching and current collecting structure to be described hereinafter.

The end of the shaft 26 adjacent the end wall 16 is flattened as indicated at 48 in Figure 2. A ratchet member 50 is secured to the flattened portion of the shaft to prevent relative rotation between the shaft and ratchet member. The ratchet member 50 includes a plurality, in this case three, of circumferentially spaced ratchet sections 51 which are separated by relieved, smooth sections 52 which have a considerably lesser diameter than the mean diameter of the members 51. A pawl 53 is mounted on a pivot and supporting pin 54 which is secured to the plate 39 at a point radially outwardly of the outermost projecting portion of the ratchet member 50. The pawl 53 is also connected to one end of a tension spring 55, the other end of which is engaged by an anchoring tongue 56 which is struck from the disc 30. As shown in Figure 2, the pawl 53 is engaging the teeth on one of the ratchet sections 51 so as to prevent rotation of the reel structure in a counterclockwise direction; however, clockwise rotation of the reel structure as viewed in Figure 2 is not inhibited by the pawl. The service cord 38 is so wound on the reel structure that a pull applied to that portion of the cord extending outwardly of the reel casing structure tends to rotate the reel drum in a clockwise direction as viewed in Figure 2 which direction of rotation increases the tension upon the spring 33. When a sufficient amount of cord is withdrawn the operator pulls the cord in the same direction until the ratchet is heard to click on the teeth 51 and then releases the cord whereupon the ratchet locks the reel against counterclockwise rotation under the bias of the spring 33 and the cord remains in its extended position for so long as the operator wishes to use the same.

If the operator wishes to restore the cord to the storage position it is first pulled outwardly from the casing to rotate the reel in a clockwise direction, as viewed in Figure 2, until the pawl 53 is in one of the relieved sections 52 of the ratchet member 50. Under these conditions the pawl is pulled so that the center of the shaft 26, the center of the pivot pin 54, the point of connection of spring 55 to the pawl, and the tongue 56 are all in a straight line and the end of the pawl adapted to engage the teeth 51 will just clear the relieved surfaces 52 on the member 50. If now the operator allows the cord to reel in under the influence of the spring the teeth 51 will strike the backside of the pawl rotating the same on the pin 54 in a counterclockwise direction, as viewed in Figure 2, and will allow the cord to reel in fully until stopped by engagement of service connection 41 with grommet 40.

Referring now again to Figure 1 the switching and slip ring structure will be described. The casing 17 is provided with a switch receiving actuator opening 58 through which extend the spaced parallel supporting legs 59 of a switch mounting plate structure having an outturned peripheral flange 60 which is secured by means of rivets 61 to the casing 17. A switch actuating member 62 of insulating material is pivotly supported on a pin 63 which is mounted in the spaced supporting arms 59 of the supporting structure. The lower end of the supporting arms 59 mount a pivot pin 64 on which is pivotally mounted a switch contact carrying arm 65 having a bifurcated portion 66 projecting upwardly above the pin 64 and receiving a pin 67 on the lower end of the actuating member 62. The projecting bifurcated portion 66 of the arm 65 is surrounded by a compression spring 69 bearing between collars 70 and 71, which in turn engage the pins 67 and 64, respectively, so as to confine the spring 69 to the position shown in Figure 1. It will be appreciated that the mechanism just described is a conventional switch actuating snap acting device. The downwardly projecting portion of the member 65 carries an insulating plate 75 which extends around the shaft 26 is spaced relation thereto. The plate 75 supports a pair of U-shaped spring contact members 76 and 77. The contact member 76 has a lower button 78 which is positioned to engage the slip ring 43 when the parts are in the position illustrated in Figure 1. Similarly, the spring contact 77 has a lower spring contact button 79 which is adapted to contact the slip ring 44. The spring contact 76 has a second button 80 which is adapted to contact the downwardly turned end of a conductor bar 81 when the parts are in the position illustrated in Figure 1; that is, the button 78 is engaging the slip ring 43, to form an electrical connection between the slip ring 43 and conductor bar 81. Conductor bar 81 is supported on an insulating connector plate 82 which is mounted in a suitable opening in the partition member 20. The conductor bar 81 is secured to member 82 by means of a hollow conducting nut 83 held in position by means of a stud 84 which also forms an anchor for one of the electrical leads 85 of the cleaner motor structure. Similarly, the spring contact 77 has an upper connector or contact button 86 which, in position of the parts shown in Figure 1, contacts the downturned end of an upper conductor bar 87 mounted on the plate 82 by means of a hollow nut 88 which is secured by means of a stud 89 which also forms an anchor and electrical connection for the second lead 90 of the electrical motor 5. As shown in Figure 1 the arm 65 is provided with a suitable opening 91 through which the conductor bar 87 extends with considerable freedom of movement so that the bar 65 is adapted to pivot on pin 64 through its full range of movement without establishing contact directly with the conductor bar 87.

The contact-making position of the parts is illustrated in Figure 1 from which it is apparent that the contactor buttons 78 and 79 engaging the slip rings 43 and 44 also act as brushes or current collectors for these elements.

In the dotted line position of the parts illustrated in Figure 1, the spring contacts 76 and 77 are removed to a considerable distance from the connector bars 81 and 87 and the slip rings whereby both leads from the electric motor 5 and both contacts from the cord reel structure are interrupted. The extreme opening movement of the switch structure is limited by means of a resilient pad 93 which is mounted on the plate 20 in a position to be abutted by the right-hand side of the plate 75 as the parts are viewed in Figure 1. From the foregoing it is believed apparent that the applicant has provided a structure wherein the control switch not only interrupts both leads to the cord reel structure but also utilizes the switching structure as current collectors for the slip rings on the cord storage drum and retains the current collectors out of engagement with the slip rings except during such time as it is actually desired to obtain an active electrical contact to the cord reel structure. The foregoing greatly simplifies and reduces the cost of the structure and also increases the life of both the slip rings and contacts as service cords are not normally reeled in or out when energized; that is, the slip rings will generally be stationary when engaged by the contact buttons 78 and 79.

The foregoing switch construction described in detail is a preferred arrangement. It is, however, within the purview of the invention to replace the rigid conductor bars 81 and 87 with flexible electrical leads which will connect between the spring contacts 76 and 77 and sized anchoring connectors corresponding to the members 83 and 88. In those instances wherein it is permissible to utilize the large frame as a common ground or return line one slip ring and its associated connectors, spring contact, etc. may be omitted. In such a situation, one electrical lead of service cord will be electrically connected to the drum structure and through it and the drum shaft to the machine frame. Correspondingly, one side of the motor will be electrically connected to the machine frame.

Figure 3:
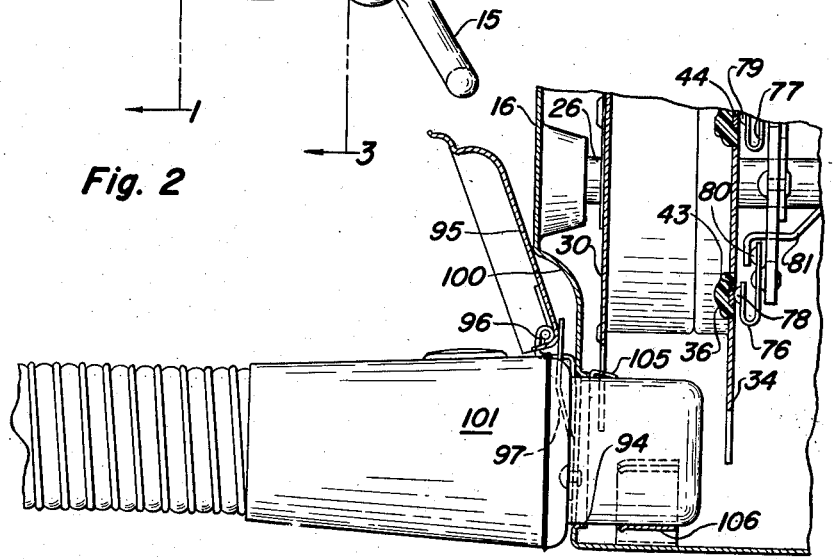
Figure 3 is a partial view of the device in Figure 1 showing the manner in which the suction cleaner is converted for blowing operation and the relation of the blower tool to the cord reel structure.

The filtered air drawn through the cleaner by the fan and motor combination 5 and 6 is discharged into the interior of the casing 17 where it circulates around the cord reel structure and then through a circular opening 94 in the end plate 16. The opening 94 does not discharge directly to atmosphere but into the interior of a movable cover and diffuser plate 95 which is pivotally supported by spaced apart hinges 96 and urged to fully closed or fully open position by a leaf spring 97 which is carried on the end wall 16. As shown most clearly in Figure 1, the upper half of the wall 95 is spaced from the wall 16 so as to allow air discharged against the rear face of the member 95 to flow upwardly around the upward edge of member 95 and thus discharge to the atmosphere. That portion of the end plate 16 supporting the cover plate 95 is dished inwardly as indicated at 100 so that the cover plate 95 does not project outwardly at the rear of the cleaner housing and forms an elongated, curved guide to diffuse and distribute air discharging through the opening 94. The spring 97 engaging the inturned edge of the cover plate 95, as shown in Figure 1, biases the cover to the closed position. When the cover 95 is rotated on the hinge structure 96 to the fully open position illustrated in Figure 3, the leaf spring 97 maintains the cover in such position. The cover member 95 is movable to the fully open position of Figure 3 to permit the insertion of the blower converter 101 which is adapted to enter and seal around the opening 94 wherefore all air discharged by the motor fan system flows through the converter 101 and the hose connected thereto for blowing operation of the cleaner. It is obvious from Figure 3 that the insertion of the tool 101 into the opening 94 completely cuts off the diffusing system formed by the cover plate 95 and dished portion 100 of plate 16.

The converter tool 101 is provided with a suitable spring latch 105 which engages the inner surface of the wall 16 to secure the converter in blowing position. Internally of the cord reel housing, the projecting end of the blower tool is supported against rocking movement by engaging within a bracket structure 106 which is secured to the internal surface of the cylindrical wall 17. As shown most clearly in Figure 2 the bracket 106 is shaped to engage the converting tool over an arc exceeding 180° thereby providing firm support for the tool and preventing the same from rocking in the opening 94.

When applied to a suction cleaner as illustrated in the manner herein it is desirable to compact the cord reel structure as much as possible in order to avoid adding unnecessary bulk to the cleaner structure. Accordingly, as is clear from Figure 3, the blower tool extends into a zone which is positioned between the side plates 30 and 34 of the reel structure. For this purpose the inside diameter of the plate 30 is made small enough to clear the inserted tool 101; however, in order to provide a large storage capacity in the drum the plate 30 is provided with three equally-spaced circumferential projections 31 which extend out to an external diameter equal to the external diameter of plate 34 as is shown most clearly in Figure 2. The construction is such that a certain amount of cord must be unreeled from the storage structure before it is possible effectively to insert the blower converting tool 101; however, when this is done the outside diameter of the cord remaining stored on the reel will be not greater than the minimum diameter of the member 30 and will not interfere with insertion of the converter tool.

The ratchet teeth 51 and pawl 53 are so positioned relative to the member 30 that the pawl can engage and lock the ratchet teeth 51 only when the protrusions 31 are not aligned with opening 94 as shown in Figure 2.

From the foregoing it will be appreciated that my invention provides an economical combined cord reel and switch structure which is adapted for use on many appliances and is particularly characterized in that the switching structure and current collector structure for the cord reel drum are integrated into a unitary device so that the current collector structure actually engages the slip rings only when a full electrical connection to the cord is desired which will normally occur only when the reel is stationary. This structure is highly effective in minimizing wear on the slip rings and current collector structure and permits the same to be greatly simplified.

It is believed further to be apparent that my invention provides a construction whereby the cord reel may be incorporated within or appended to a suction cleaning device with a minimum addition to the bulk thereof and may be so constructed and arranged as to provide for most effective conversion of the cleaner to blowing operation without interference between the cord reel and blower converter connection while utilizing the blower connection in part as an exhaust air diffuser for the cleaner structure to prevent a concentrated blast of air from the rear end of the cleaner which has been found to be objectionable.

While I have illustrated and described the invention in considerable detail, it is to be understood that various changes may be made in the arrangement, proportion and construction of parts without departing from the spirit of the invention or the scope of the appended claims.

I claim:

1. In a suction cleaner having a frame structure, a filter carried by the frame, a suction air pump for producing a flow of cleaning air through the filter and an electric motor for driving the air pump, the combination of a service cord storage drum rotatably mounted on the frame and having a slip ring thereon, a service cord having one end connectible to a source of current and the other end secured to the drum and being electrically connected to the slip ring, a switch member movably mounted on the frame having a contact thereon adapted to engage the slip ring, means for selectively moving the switch member between a first position in which the contact engages the slip ring to provide electrical connection thereto and a second position in which the contact is disengaged from the slip ring, said means extending exteriorly of said casing frame structure for manually moving said switch member to its different positions whereby said drum may be rotated to wind and unwind said service cord while said switch member is disconnected from said slip ring and stationary means for establishing electrical connection between the contact and motor whereby the contact serves as a current collector for the service cord and as a control switch to govern energization of the motor.

2. A cord storage and switch mechanism comprising a housing structure, a cord storage drum rotatably mounted in the housing structure, a pair of separated slip rings rotatable with the drum, a service cord having one end connectible to a source of current and the other end electrically connected to the slip rings, a switch structure mounted on the housing structure including a manually operable actuator, a switch arm movably mounted on the housing structure, contact means carried by the switch arm to engage the slip rings in one position of the switch arm, means including a snap acting mechanism providing a driving connection between the actuator and switch arm for moving the switch arm with a snap action between said position and another position in which the contact means are disengaged from the slip rings, said actuator projecting exteriorly of said housing structure for manually moving said switch arm to its different positions whereby said drum may be rotated to wind and unwind said cord while said switch arm is in said another position out of engagement with said slip rings.

3. Apparatus according to claim 2 including fixed contacts carried by the housing structure positioned to be engaged by the contact means in said one position of the switch arm.

4. A cord storage and switch structure comprising a casing, a shaft in the casing, a cord reel rotatably mounted on the shaft, a service cord wrapped about the reel and having one end connectible to a source of current and the other end anchored to said reel, a pair of slip rings carried by the cord reel, means electrically connecting the slip rings to the anchored end of the service cord, a pair of fixed electrical contacts positioned in spaced relation to the slip rings, and a switch structure having a movable arm, insulating means on the arm, a pair of bridging contacts carried by the insulating means each of said bridging contacts being positioned to engage one of said slip rings and one of said fixed contacts, and means for actuating said switch arm to move said bridging contacts between a first position in which said bridging contacts establish connection between said pair of fixed contacts and slip rings and a second position in which said bridging contacts are disengaged from said pair of fixed contacts and slip rings, said actuating means projecting exteriorly of said casing for manually moving said switch arm to its different positions whereby said reel may be rotated to wind and unwind said cord while said switch arm is in said second position out of engagement with said pair of fixed contacts and slip rings.

5. A cord storage and switching structure comprising a casing, a cord storage drum rotatably mounted in the casing, a service cord having one end extending beyond said casing and connectible to a source of current and the other end secured to the drum, a pair of slip rings carried by the drum and electrically connected to the secured end of the service cord, a switch structure on the casing including a unitary movably mounted member having spaced contacts thereon and actuating means for moving said member between a first position in which each of said contacts engages a separate one of said slip rings and a second position in which said spaced contacts are disengaged from said slip rings whereby said contacts function as current collectors when engaged with said slip rings and as switch means to control electrical connection to the service cord, said actuating means extending exteriorly of said casing for manually moving said unitary member to its different positions whereby said drum may be rotated to wind and unwind said service cord while said spaced contacts are disengaged from said slip rings.

6. In a service cord storage and control structure having a rotatably mounted cord storing reel provided with slip rings arranged normal to the axis of reel rotation and electrically connected to a service cord secured to the reel, the combination of a combined switch and current collector comprising a unitary movably mounted switch arm, a pair of contacts on the arm, and actuating means operable during rotation of said reel for moving the switch arm between a first position in which each of the contacts engages a separate one of the slip rings and a second position in which the contacts are disengaged from the slip rings whereby the switch contacts function as current collectors when engaged with the slip rings.

7. In a service cord storage and control structure having a rotatably mounted cord storing reel provided with slip rings arranged normal to the axis of reel rotation and electrically connected to a service cord secured to the reel, the combination of a combined switch and current collector structure comprising a pair of contacts, an insulating structure supporting said pair of contacts in spaced relation to each other, a snap acting mechanism having a manually operable actuating lever operable during rotation of said reel for moving said insulating structure between a first position in which said contacts each engage a separate one of said slip rings to provide electrical connection thereto and a second position in which said contacts are disengaged from the slip rings.

UNITED STATES PATENTS

References Cited in the file of this patent

| | | |
|---|---|---|
| 1,363,417 | Hunt | Dec. 28, 1920 |
| 1,599,124 | Fisler | Sept. 7, 1926 |
| 2,173,777 | Eads | Sept. 19, 1939 |
| 2,292,250 | Tamarin | Aug. 4, 1942 |
| 2,323,275 | Lofgren | June 29, 1943 |
| 2,438,082 | Wester et al. | Mar. 16, 1948 |
| 2,503,568 | Timm | Apr. 11, 1950 |
| 2,594,456 | Kroenlein | Apr. 29, 1952 |

FOREIGN PATENTS

| | | |
|---|---|---|
| 569,088 | France | Jan. 4, 1924 |